Nov. 2, 1965   W. J. DAVIS   3,214,873
WINDOW FRAME STRUCTURE
Filed Feb. 19, 1964   7 Sheets-Sheet 1

INVENTOR.
WILLIAM J. DAVIS
BY
William H. Woodlief
ATTORNEY

Nov. 2, 1965  W. J. DAVIS  3,214,873
WINDOW FRAME STRUCTURE
Filed Feb. 19, 1964  7 Sheets-Sheet 2

INVENTOR.
WILLIAM J. DAVIS
BY
William H. Woodlief
ATTORNEY

Nov. 2, 1965    W. J. DAVIS    3,214,873
WINDOW FRAME STRUCTURE
Filed Feb. 19, 1964    7 Sheets-Sheet 3

INVENTOR.
WILLIAM J. DAVIS
BY William H. Woodlief
ATTORNEY

*INVENTOR.*
WILLIAM J. DAVIS
BY
*William H. Woodlief*
ATTORNEY

Nov. 2, 1965  W. J. DAVIS  3,214,873
WINDOW FRAME STRUCTURE
Filed Feb. 19, 1964  7 Sheets-Sheet 6

INVENTOR.
WILLIAM. J. DAVIS
BY William H. Woodlief
ATTORNEY

Nov. 2, 1965 W. J. DAVIS 3,214,873
WINDOW FRAME STRUCTURE
Filed Feb. 19, 1964 7 Sheets-Sheet 7

INVENTOR.
WILLIAM J. DAVIS
BY
Walter J Monacelli
ATTORNEY

United States Patent Office 3,214,873
Patented Nov. 2, 1965

3,214,873
WINDOW FRAME STRUCTURE
William J. Davis, Girard, Ohio, assignor to Republic Steel Corporation, Cleveland, Ohio, a corporation of New Jersey
Filed Feb. 19, 1964, Ser. No. 346,053
7 Claims. (Cl. 52—215)

This application, which is a continuation-in-part of my prior copending application, Serial No. 89,271, filed February 14, 1961, and now abandoned, relates to an improved metal window frame for houses and other buildings. More particularly, it relates to a metal window frame structure having hinged flanges and other improvements in the structure thereof.

According to present practice, window frames are generally assembled at a manufacturing site and shipped to distribution points and eventually to the building construction site. Then they are fitted and fastened into appropriate openings in houses and other buildings under construction.

This prefabrication of the window frame saves considerable time and expense in construction. Various means are used for attaching or securing the window frame to the house or building structure. For metal window frames the means of attachment generally consists in having rigid fins or flanges extending from the outer peripheral surface of the window frame and then nailing or otherwise securing these flanges to the main building structure.

Since these flanges extend approximately an inch or more from the main structure of the window frame and are generally quite thin, the corners and edges are easily bent. Therefore, rough handling or bumping of the windows during transit results in considerable bending or denting of the flanges. This necessitates considerable repair work and in some cases makes it difficult or troublesome to secure a tight fit of the window frame against the surface of the building structure to which it is to be fastened.

In order to avoid this bending or denting of the flanges, it is sometimes the practice to create the window frames or to board the sides of the window frames. These protective measures involve an additional expense. In either case, by virtue of the damage to unprotected flanges or because of the protective measures required to avoid such damage, the present type of fin or flange structure has definite disadvantages.

It has now been found that the disadvantages of the present type of flange structure can be avoided and resultant damage or necessity for protective measures can be avoided by a hinged flange structure as described herein. Moreover, it has been found also that the assembly and structure of the window frame with complete glass assembly is simplified by a "jamb strip" which provides for weather protection, sliding facilities, centering and screen attachment by its particular design as described hereinafter.

By means of the particular "hinged flange" structure described herein, the flanges are positioned flat against the side of the window frame during shipment and handling so as not to be exposed to the bumping or blows frequently encountered in transit to the construction site. The flanges can be maintained in this prospective position up until the time the window frame is to be secured to the building, at which time the flanges are moved to an open position perpendicular to the peripheral wall of the window frame structure and secured by nails or screws to the wall of the building, thereby fastening the window frame securely in position.

The hinged flange structure of this invention is constructed by forming in or on that side of the respective jambs, head and sill which will eventually form the outer peripheral or perimeter surface of the window frame, a deep groove or channel having in cross-section a narrow mouth or neck opening at the entrance and then inwardly beyond this narrow-necked opening having a flared out or larger opening. In other words, at the entrance, the groove or chanel is relatively narrow. Then, in the deeper section of the groove or channel, the opening becomes wider. In one of the preferred modifications of this invention, the transverse cross-section of this groove has a shape somewhat resembling the letter "P" with a relatively short tail portion. The tail portion then represents the neck or narrow part of the groove opening. This straight portion extends advantageously to the full depth of the groove, and the groove flares out on one side in a curved, expanded section resembling the loop of the letter P. This preferred form is illustrated in various drawings. Another preferred modification of the invention has this groove or channel built up on the surface wall of the tubular section as shown hereinafter.

The flange which is fitted into this groove to form the hinged flange is formed by taking thin metal sheet of appropriate length and width and folding a linear edge on itself or curving it on itself to give a folded or curved section through the entire length of that edge of the flange. This folded or curved section is made wide or thick enough to prevent its sliding through the narrow neck of the above-described groove and still small enough to fit at least partially into the enlarged portion of the groove. In this way the thickness of the flat porion of the flange is easily accommodated in the neck of the groove, but the turned over portion of the flange cannot pass through the neck of the groove.

The body or main section of the groove is large enough to permit movement of the turned over portion of the flange as the flange is moved from an open position or a closed position as described herein. The individual flanges are inserted into the respective grooves or channels of the head, sill and jambs before the window frame structure is assembled. This is effected by inserting the longitudinal end of the turned over portion of the flange into the groove or channel in such a manner that the flat part or single thickness of the flange fits into the neck of the groove. Then the flange is slid lengthwise into the groove until it occupies the full length thereof. Once the jambs are fastened to the head and sill, the flanges can no longer move lengthwise in the grooves and are, therefore, prevented from sliding out. However, since the flanges are free to move from the open to the closed positions, and vice versa, as described herein, the net effect is a hinging of the flange to head, sill or jamb.

Another feature of applicant's invention is a particular design of "jamb strip" which has a channel adapted to fit securely over an inwardly extending flange or wall of the jamb. That wall of the section of this jamb strip which will face to the inside of the building, has on its surface opposite from the aforesaid channel a lip perpendicular to this wall and extending the length of the jamb strip. This lip serves as a guide for a movable window sash which is positioned between this lip and a corresponding lip on the jamb strip on the opposite jamb of the window. The opposite wall of this jamb strip which forms the other wall of the aforesaid channel is attached near the open end of the aforesaid channel to a section of the jamb strip which turns at a right angle to this other wall and for a distance sufficient to accommodate the thickness of a window pane. Then this section of the jamb strip takes a right angle turn into one of the tips of a U-shaped section which forms a second channel facing in the opposite direction from the first channel. This second channel is adapted to receive a weather bead which will press against and hold into position the aforesaid window pane. The outer wall of this second channel-forming section of the jamb strip, e.g. the wall facing the outside of the window frame, has a flange extending in the opposite direction from and in the same plane of said wall, running the length of the jamb strip and of sufficient width to meet the inner side of the jamb when the jamb strip is positioned on the aforesaid inwardly extending flange of the jamb.

As described more fully hereinafter, this jamb strip serves a number of functions, namely as a guide or centering device for the movable sash on one side, as a retaining device for a fixed window pane, as a receptive means for the weather bead, and as a retaining wall for holding a screen in the outer section of the window frame. While this strip is referred to as the "jamb strip," a similar strip can be used on the inner side of the head, and in some cases of the sill, with appropriate modifications in design to suit particular designs or purposes.

The invention is illustrated best by reference to the various drawings.

In accordance with these drawings, the window frame of this invention is formed of head, sill, and connecting jambs. These are tubular sections of metal, preferably formed or shaped from a single sheet of metal, such as steel, cut to the desired dimensions and the various tubular sections jointed to each other by various means, such as bolting, welding, etc.

Face 1 is the extreme outer face of the head, e.g. the surface of the head which will face outwardly and extend furthest to the outside of the building. Face 2 is the extreme outward face of the sill. Face 3 is the extreme outward face of the jambs. Since the head and jambs generally have the same cross-sectional configuration of their tubular sections, reference numerals 1 and 3 are interchangeable depending on whether a particular tubular section of this design is being used as a head or jamb.

Figures 1, 2:
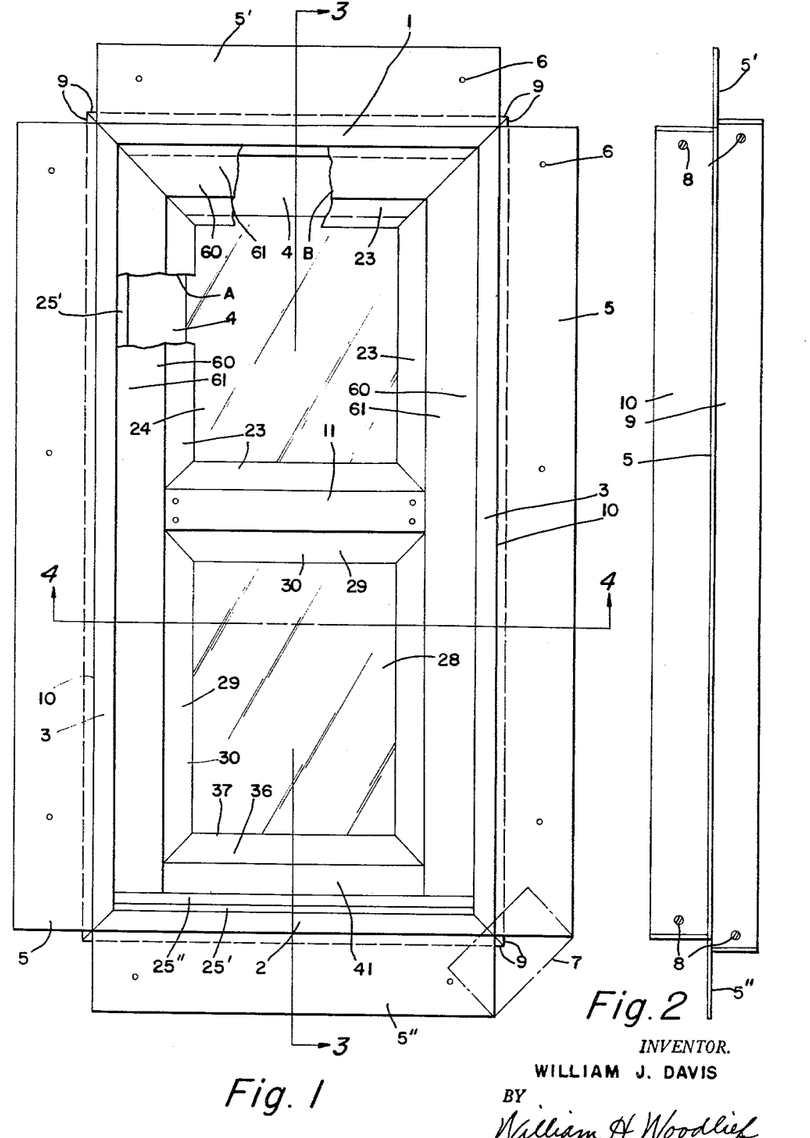
FIG. 1 is a front elevation of a window frame of this invention with broken sections A and B disclosing inner portions thereof.
FIG. 2 is a side elevation of the window frame shown in FIG. 1.
Figure 3:
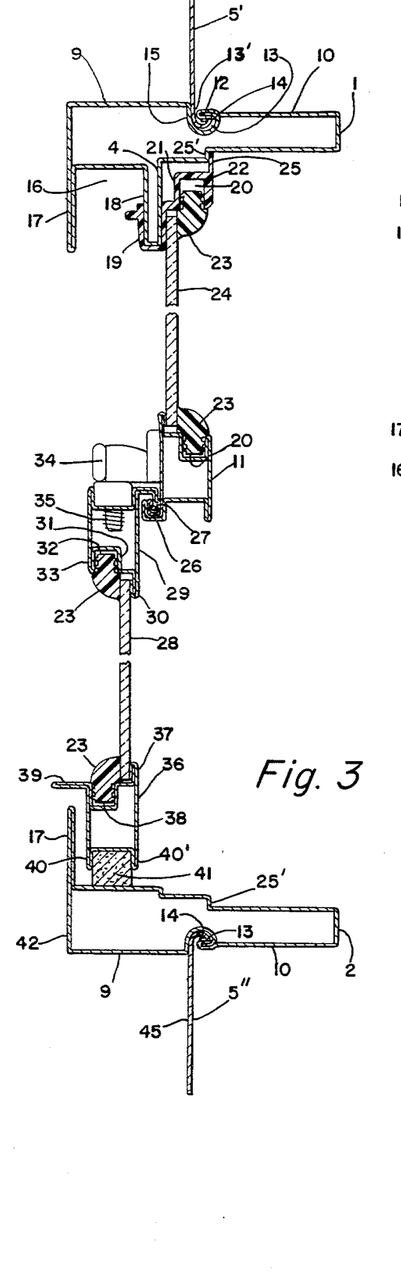
FIG. 3 is a fragmentary transverse vertical section taken at 3—3 of the assembled window frame structure shown in FIG. 1.
Figure 24:
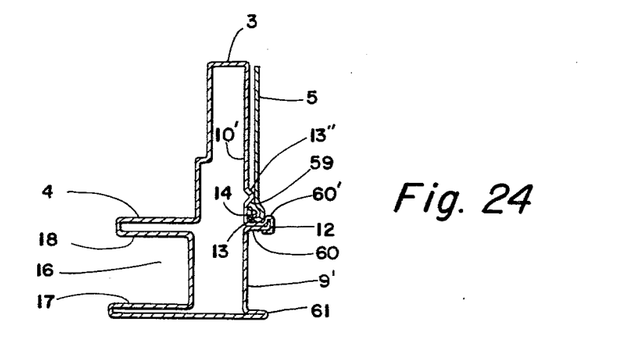
FIG. 24 is an end view of a jamb having on externally built-up channel or groove and hinged flange arrangement.
Figure 25:
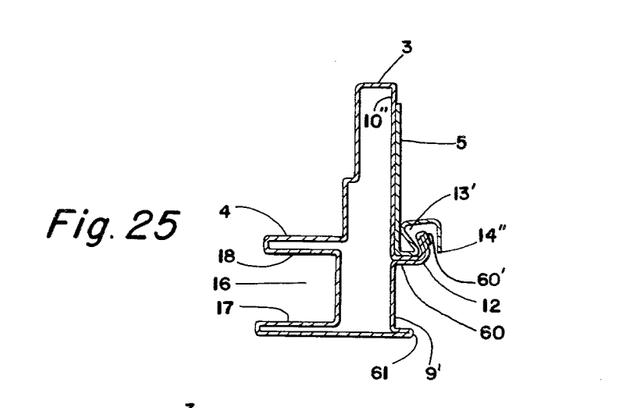
FIG. 25 is an end view of another jamb having an externally built-up channel or groove and a preferred flange arrangement shown in a closed position.

Face 4 is the outward face of the wall or flange 18 on which is positioned the jamb strip described herein. On a tubular section used as a head, this face is identified as 4. Flanges 5, 5' and 5" are the hinged flanges which are a feature of this invention, and these reference numerals designate the hinged flanges positioned in the jamb, the head, and the sill respectively. In most of the figures, such as FIGS. 1–8, 21 and 26 these hinged flanges are shown in an "open" position. In FIGS. 24 and 25 the hinged flange is shown in a "closed" position. Openings 6 are holes in the hinged flanges for nails or screws to be used in fastening the flanges, and thereby the window frame, to the building wall. Dotted section 7 in the extreme lower right hand corner of FIG. 1 shows the position of a plastic flexible film which is adhered to two of the hinged flanges. The use of these plastic films is optional and they can serve as weather stripping when the window frames are attached to the building. When the hinged flanges are in a closed position, e.g. lying flat against the sides of the window frame, these pieces of flexible film are folded or looped.

Bolts 8 in FIG. 2 illustrate one method of attaching the jamb sections 9 and 10 to the head and sill respectively. Jamb section 10 is that section which extends outwardly from the building structure when the window frame is attached thereto. Jamb section 9 is that section which extends inwardly upon attachment to the building structure.

As illustrated by various cross-section views, the tubular sections are formed by shaping a single sheet of metal in such a manner that two parallel edges are brought together and folded over each other to form a seal 12. This seal can be located in various sections of the tubular structure but preferably is formed in the flange-receiving groove described herein. In shaping the tubular section, a deep groove or channel 13 is formed for receiving folded over flange portion 14 of hinged flange 5, 5' or 5". The mouth or neck 13' of this deep groove or channel 13 is relatively narrow, whereas the body or main section of the groove is much wider. A shoulder 15 in the groove or channel permits the hinged flange to rest flat against one side of the groove when the flange is in an open position. This can be accentuated by having tubular surface section 9 at a higher level or extending outwardly more than tubular surface section 10 on the other side of the groove. A channel 16 is formed by folding the sheet metal of the tubular section to form flange 17 and flange or wall 18.

Figures 7, 8, 9:
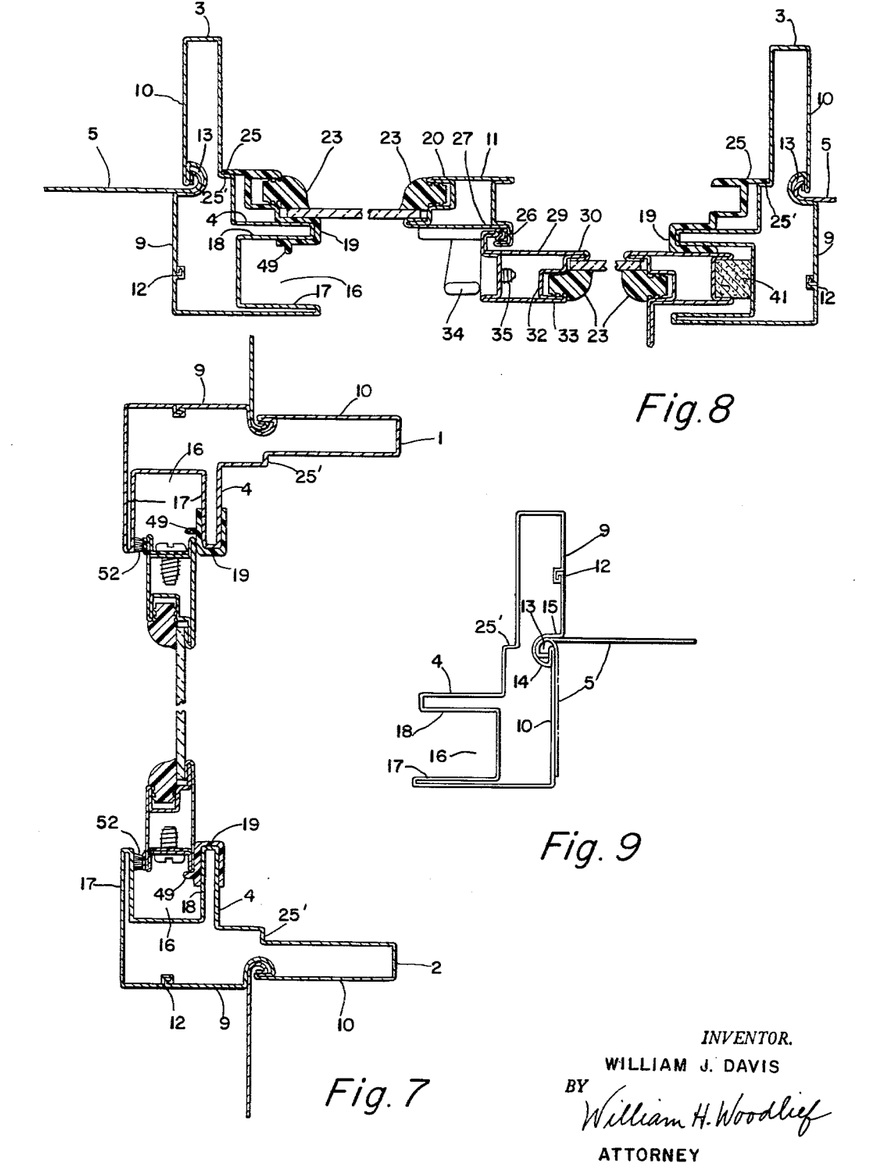
FIG. 7 is a fragmentary transverse vertical section taken at 7—7 of the window frame shown in FIG. 5.
FIG. 8 is a fragmentary transverse horizontal section taken at 8—8 of the window frame assembly shown in FIG. 5.
FIG. 9 is a detail drawing showing an end view of the hinged flange and the tubular frame portion in which the flange is inserted. The flange is shown in the "open" position and the dotted outline shows the flange location when it is in the "closed" position.
Figure 18:
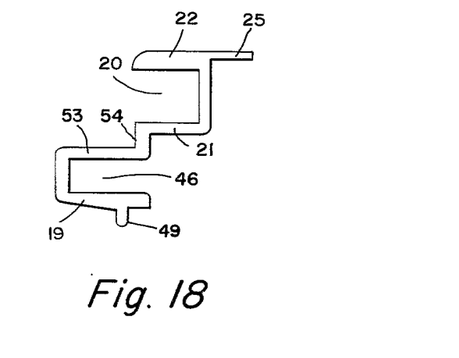
FIG. 18 is an end view of the jamb strip.

Jamb strip 19 shown in FIG. 18 is adapted to fit onto flange 18 as shown in FIGS. 7 and 8. Jamp strip 19 can be made of various plastic materials and is designed to serve many functions including weather stripping, screen attachment, sliding and centering means for a sliding window sash, etc. In this jamb strip, channel 20 is provided between flanged sections 21 and 22. This channel is adapted to receive a weather bead 23 to provide a tight seal around the edge of the window pane 24 or 28. A lip 25 extends from the main part of the jamb strip so as to provide contact at 25' with the lower side of the head, or where appropriate, with the side of the jamb. The lower part of the window pane rests on a fixed tubular section or meeting rail 11 (shown in detail, but in inverted position with respect to 11, in FIG. 12) and is held in position and sealed by weather bead 23.

Figure 12:
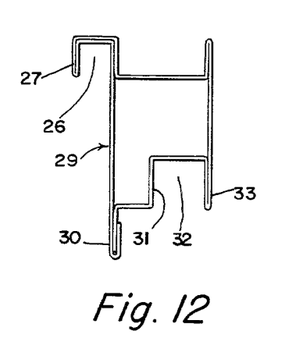
FIG. 12 is an end view of a meeting rail.

The upper window pane in FIG. 1 is a fixed window by virtue of this tubular section 11 being fixed to the jambs as shown in this figure. The lower part of this tubular section 11 has a groove 26 extending inwardly and then upwardly, thereby forming a groove or channel which is adapted to receive a lip 27 extending downwardly from the upper part of the frame 29 around window plane 28 for which the overall structure provides a sliding window which can be raised or lowered. This frame 29 is a tubular section identical in cross-section to that of 11, but is in a position inverted with respect to that shown as 11. Details of this frame 29 are shown in FIG. 12.

The fitting of lip 27 into the groove or channel 26 can be weather-sealed by having the groove lined with a soft weather-proofing material. The top of the frame 29 for this slidable window sash has a flange 30 extending downwardly and against which the window pane is held by the weather bead 23 which fits into groove 32 formed between flange 33 and the upper extension 31 of flange 30. Lock assembly 34 is of standard design and is attached to the upper part of frame 29 by bolt 35.

The lower part of window pane 28 rests on lower frame section 36 (shown in detail in FIG. 14) which has a flange 37 extending upwardly against which the window pane is held firmly by weather bead 23 positioned in groove 38 in the upper part of this lower frame section 36. Flange 39 which extends horizontally from this lower frame section serves as a grip for raising and lowering this window sash. Two lips 40 and 40' extend vertically downward from the bottom of this lower frame section to form a groove or channel 43 into which weather stripping or runner 41 fits securely to provide a weather seal. This runner is attached to the sill by means of adhesive or screws, etc. Sill 42 is a shaped tubular section (shown in detail in FIG. 11) having a groove 13 shaped therein with narrow neck or mouth 13' and a larger body section adapted to receive the turned over edge section 14 of the flange 5". Hinged flange 5" is shown in an open position for attachment to a building wall not shown but positioned on side 45 of flange 5.

Figure 4:
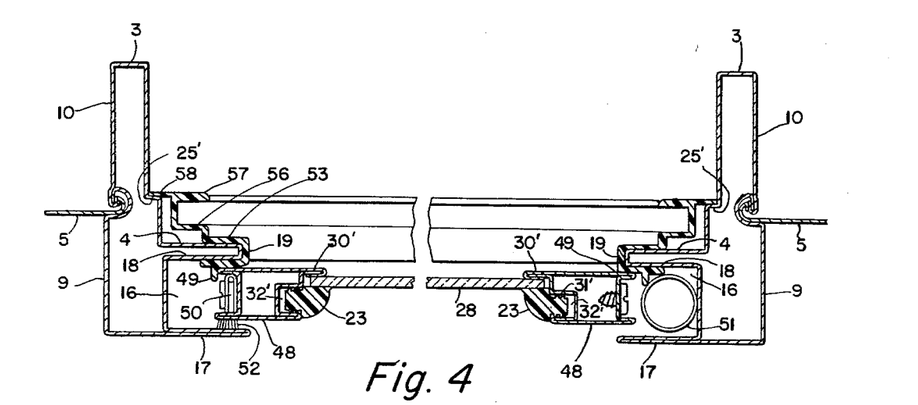
FIG. 4 is a fragmentary transverse horizontal section taken at 4—4 of the assembled window frame structure of FIG. 1.

FIG. 4 shows a horizontal cross-section of a sliding window sash or vent window taken at line 4—4 in FIG. 1. The glass panel 28 is enclosed by vent jamb 48, shown in detail in FIG. 13 although the view is inverted from that shown in FIG. 4, and is sealed into position by weather bead 23. Lips 49 on jamb strips 19 serve to center and guide the vent window or sliding sash. Standard tensioning device 51 serves to hold the vent window at any desired vertical position.

Figure 5:
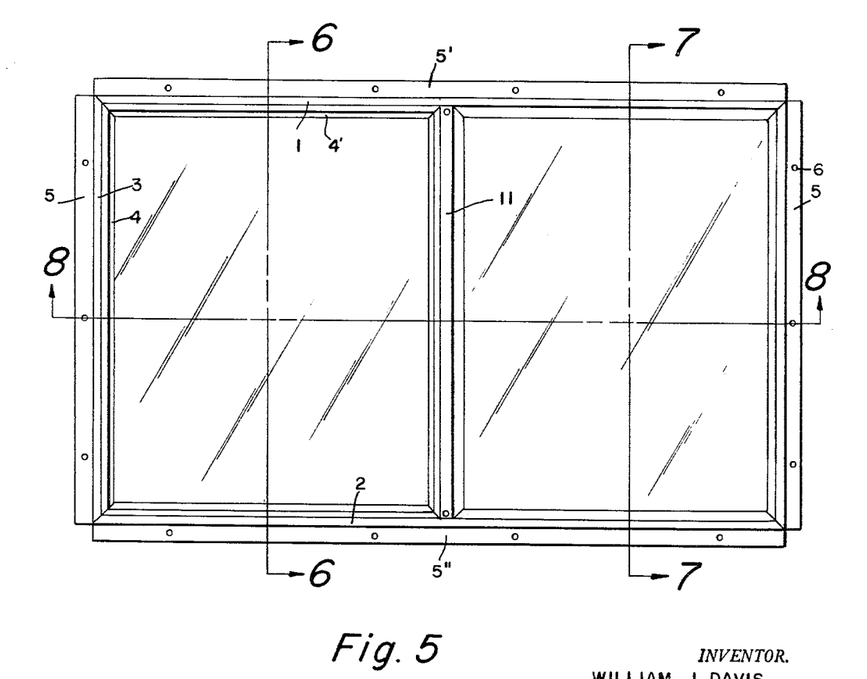
FIG. 5 is a front elevation of a horizontally arranged window having a fixed window pane on the left and a sliding sash on the right.

FIG. 5 illustrates a typical horizontal arrangement. Although details are not shown in FIG. 5, details are shown in various cross-sections taken at lines 6—6, 7—7, and 8—8 as shown in FIGS. 6, 7 and 8 respectively for the arrangement having a fixed window at the left and a slidable sash at the right.

Figure 6:
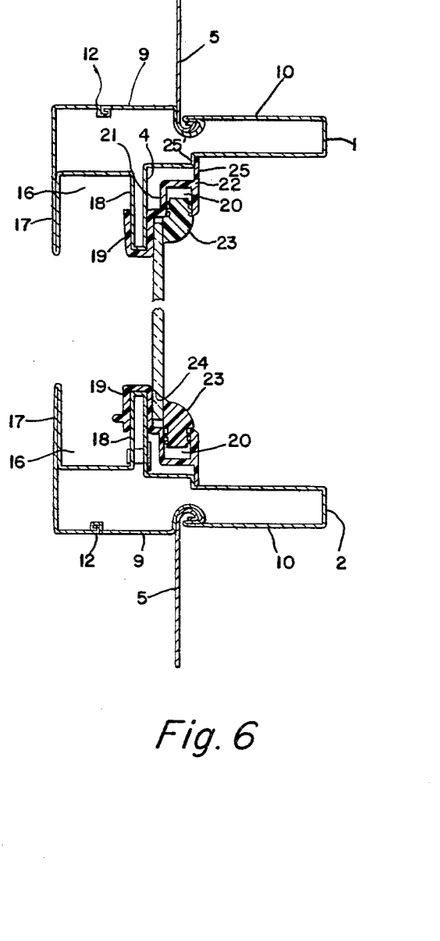
FIG. 6 is a fragmentary transverse vertical section taken at 6—6 of the assembled window frame structure shown in FIG. 5.

In FIG. 6, which shows a section taken at 6—6 of the horizontal window ararngement of FIG. 5, jambs 4 are tubular sections formed from a single piece of sheet metal with parallel edges bent over each other and sealed at 12, which in this case is at a location other than in the hinged flange-receiving groove as shown in various other figures.

FIG. 7 shows a section taken at 7—7 of the horizontal window arrangement of FIG. 5. In this modification, an abbreviated form of jamb strip 19 is used to accommodate this arrangement. Lip 49 serves as a guide for the sliding window sash.

FIG. 8 is a horizontal cross-section taken at 8—8 of the horizontal arrangement shown in FIG. 5. The design resembles that of a vertical arrangement except that modifications have been made for horizontal sliding of the vent window.

FIG. 9 illustrates the positioning of flange 5 in an open position when the folded portion 14 is inserted in groove 13 of a jamb. The doted section indicates the position when flange 5 is turned to the closed position.

Figure 10:
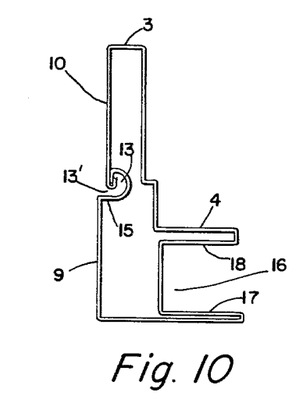
FIG. 10 is an end view of a head or jamb.
Figure 11:
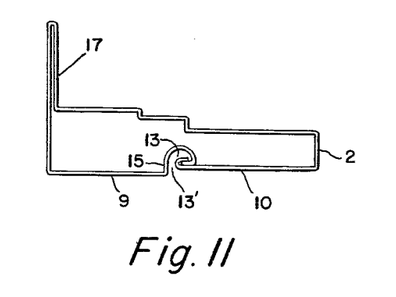
FIG. 11 is an end view of a sill.

FIGS. 10 and 11, as indicated above, are end views of a head or jamb, and of a sill, respectively.

FIG. 12 is an end view of a meeting rail as described above.

Figure 13:
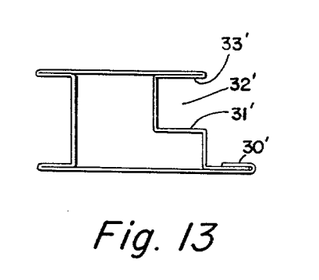
FIG. 13 is an end view of a vent head and vent jamb.

FIG. 13 is an end view of a vent head or vent jamb and corresponds in certain details to features of the meeting rail of FIG. 12. To indicate this, certain corresponding elements have been identified as 30', 31', 32' and 33' to indicate that they serve similar functions as the corresponding elements in FIG. 12.

Figure 14:
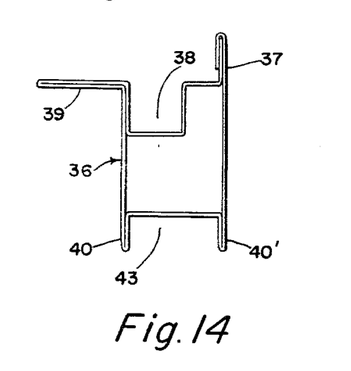
FIG. 14 is an end view of a vent sill.

FIG. 14 is an end view of a vent sill, the various elements of which and their functions have been described above.

Figure 15:
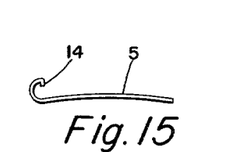
FIGS. 15 and 16 are end views of two types of flanges used in making the hinged flange.
Figure 16:
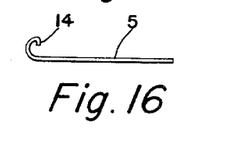

FIGS. 15 and 16 each show an end view of a flange having a preferred form of bent-over flange portion 14 for use as a hinged flange in this invention. FIG. 15 illustrates a flange having a slight curvature in the width of the flange. Upon fastening of the flange against the building wall, this assumes a flat configuration which exerts pressure against the fastening device.

Figure 17:
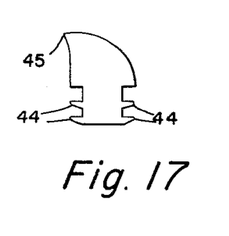
FIG. 17 is an end view of a weather bead.

FIG. 17 is a detailed drawing of an end view of the plastic weather bead, identified as 23 in some of the assembly drawings. Tips 44 are designed to give a tight fit into the receiving channel 20, or 32, or 38, as indicated in various figures. Tapered edge 45 insures a tight fit against the window pane. These weather beads can be made of various plastic materials. Plasticized polyvinyl chloride has been found to be particularly suitable.

FIG. 18 is a detail drawing of an end view of the jamb strip. As described above, channel 46 is formed by walls 19 and 53. On one side of wall 19, lip 49 serves as a guiding and centering means for window vents or sliding sashes. Channel 46 is designed to fit over the flange directed inwardly from the jamb. Receiving edge 54 is the surface against which the edge of the window pane is positioned. Channel 20 formed by wall 21 and 22 is designed for holding weather bead 23. The extension 25 of wall 22 is provided to rest against the inner wall of a head or jamb. These jamb strips can be made of various plastic materials. However, unplasticized polyvinyl chloride has been found to be particularly suitable.

Figure 19:
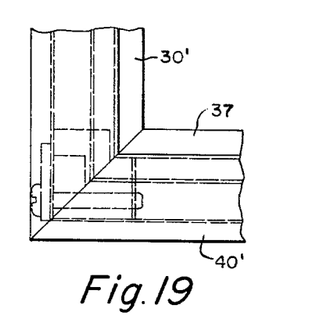
FIG. 19 illustrates a typical method of corner assembly of a vent window or movable sash.
Figure 20:
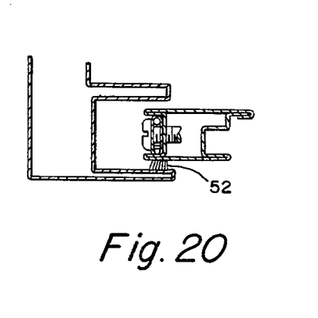
FIG. 20 is a top view of the assembly of the vent window corner of FIG. 19 in position in the channel of a jamb.

In addition to the type of assembly in bolt fastening shown in FIG. 19, various other means of assembly and fastening can be used, such as welding, etc.

Figure 21:
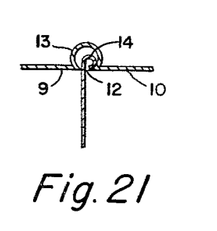
FIG. 21 is an end view of a less preferred type of groove and the flange positioned therein.

FIG. 21 illustrates a different, less preferred type of groove and the arrangement of the hinged flange therein which can also be used. However, the type of groove illustrated in the other figures is a preferred form. FIG. 21 also shows the surfaces 9 and 10 in the same plane of the tubular section.

Figure 22:
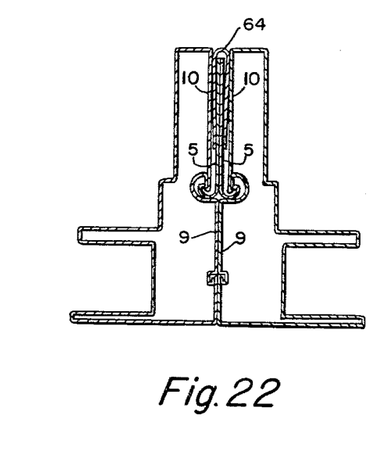
FIG. 22 is a transverse horizontal view of two jambs in two different window frames jointed together by a mullion as would be used in positioning two complete window frames side by side.
Figure 23:
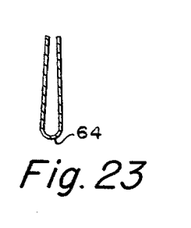
FIG. 23 is a transverse cross-section of the mullion used in FIG. 22.

As illustrated in FIG. 22, two or more window frames of this invention can be assembled side by side by inserting a mullion 64, as shown in FIG. 23, to hold the hinged flanges of two adjacent window frame sections in tight position against each other and in the aforedescribed closed position. The mullion advantageously runs the length of the flanges which are to be held together and comprises a piece of sheet metal of appropriate dimensions folded over to give it a shape having a U-shaped cross-section.

In FIG. 24 another preferred hinged flange arrangement is shown. In this case, the channel or groove 13, adapted to receive the curved or folded edge 14 of the hinged flange, is built up externally of the peripheral wall (9' and 10') of the jamb. Ridge 59 is formed in this wall and the sheet of metal forming this jamb is shaped to form an extended flange 60 whose external edge 60' is tipped or tilted toward ridge 59 so as to leave only a narrow opening 13'' between this external edge and the ridge, which corresponds to the narrow-necked opening or mouth 13' previously described. The space embraced by the extended flange, the ridge 59 and that area of the jamb (or head or sill) perimeter surface between the ridge and the extended flange comprises the deep groove or channel 13 as previously described into which folded or curved portion 14 of the hinged flange 5 (or 5' or 5'') is fitted.

While FIG. 24 shows the extended flange 60 extending first in a plane perpendicular to the tubular section wall from which it rises, and then in a plane substantially parallel to that tubular section wall, it is possible to have this extended flange designed with a curved cross-section such that it is substantially concentric with and embraces the curved flange portion 14. Moreover, while extended flange 60 is also shown as comprising seal 12 in a preferred manner, it is also possible to have this seal located elsewhere in the tubular section. Flange 61 is an extension of the end wall of the jamb, or head, or sill.

In view of the number of folds of metal in this externally built or extended flange 60, it is very strong and resistant to damage. Flange 5 is shown in a closed position, parallel to wall 10'. In the parallel position shown, the resiliency of the metal permits enough bending of the flange to touch wall 10' without permanent bending or damage. Therefore, the flange is well protected against injury in this parallel position. When flange 5 is in the open position, external edge 60' acts as a shoulder for bracing flange 5 and curved or folded section 14 rests against ridge 59 to give a rigid character to the flange with respect to the jamb, head or sill in which it is located.

Figure 26:
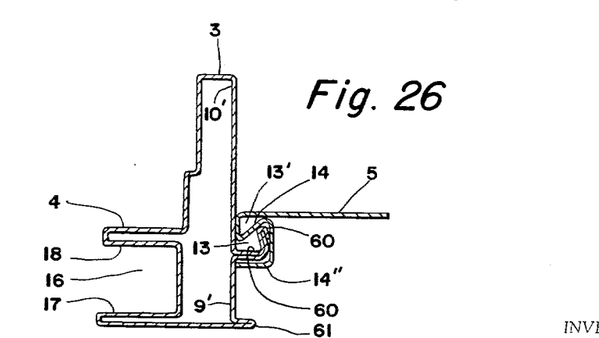
FIG. 26 is a view similar to that of FIG. 25 with the flange in an open position.

Another preferred form of hinged flange is shown in FIGS. 25 and 26 with the flange 5 in a closed position in FIG. 25 and in an open position in FIG. 26. In this design, the groove 13 is built up externally of the peripheral wall as at 9' and 10' of the jam. Flange 60 is formed or affixed so that in its initial portion it extends approximately perpendicularly from the peripheral wall and then is turned laterally so that external edge 60' is tipped or tilted toward the peripheral wall thereby forming groove 13 with a narrow neck portion 13'. The hinged flange is shaped by having a curved portion 14 some distance from the peripheral wall so that the lateral edge portion 14'' remains outside groove 13 in both the open and closed positions. This flange is designated so that the lateral edge portion 14'' presses against the peripheral surface outside of groove 13 but at a point close to where flange 60 is attached to the peripheral surface. The curved portion 14 is designed so as to press against the external edge 60' of extended flange 60 at the same time that the flange lateral edge portion 14'' is pressed against the aforementioned peripheral surface. This gives a locked effect and rigidity to the hinged flange when it is in the open position.

In various figures a rubbing block 52 is shown which serves the purpose of keeping the vent frame in weather-sealing contact with the jamb strip. This rubbing block is advantagously made of a resilient, frictionless material, such as wool pile. Bracket 50 is shown as a fastening device in the vent frame.

Although it is generally preferred that the hinged flange folds toward the front or outer side of the window frame in assuming a closed position, it is also possible to have the flange and groove designed in such a manner as to have the hinged flange fold or swing to the rear or inner side of the window frame for a closed position. This is shown in FIG. 9 where peripheral wall sections 9 and 10 are also shown in a different modification and in reverse relationship to that shown in other figures.

In addition to those shown in the various figures, various other combinations of fixed and hung windows can be used in the practice of this invention. For example, in both vertical and horizontal arrangements, there can be two movable windows, with or without a third fixed window; and there can be two fixed windows, with or without a third movable window. For example, a vertical arrangement can be used with a fixed middle window and movable windows above and below the fixed window. In the corresponding horizontal arrangement, the fixed window is in the center and movable windows on the right and left of it. In another arrangement, there can be two fixed windows at the top and bottom, or right and left, and a movable window in between. It is also contemplated that the features of this invention can be used with a single fixed window, and with any number of fixed windows without any movable window.

Moreover, as indicated in FIG. 22, two or more window frames can be arranged side by side, either in vertical or horizontal arrangement and attached to each other by mullions or other means.

While polyvinyl chloride has been indicated as the preferred plastic material for the jamb strips and weather beads, other plastic materials can be used for these purposes as well as for the weather stripping. Plastic materials having a substantial amount of resiliency, including rubber of various types, are preferred for such purposes.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. In a metal window frame structure comprising a head, a sill, and jambs connecting said head and sill, said head, sill and jambs each comprising a tubular section shaped from sheet metal, the improvement comprising (1) a groove of substantially uniform transverse cross-section running longitudinally and through the length of each tubular section comprising said head, sill and jambs upon the side thereof forming the extreme side, bottom and top outer perimeter surfaces of said window frame structure, said groove thereby forming an outer peribperal groove vertically and horizontally around said window frame structure, said peripheral groove being adapted to receive and retain therein a flange in each vertical and horizontal portion of said perimeter surface, and said groove having a narrow width in the mouth thereof and a greater width in the deeper portion thereof, (2) four supporting flanges of flat, thin metal, said flanges being positioned respectively with a lateral curved portion thereof in said peripheral groove in the two vertical and two horizontal surfaces of said outer perimeter surface, the lateral curved portion of each of said flanges which is inserted in said grooves being folded so as to prevent said flanges from moving laterally out of and away from said grooves, and said flanges being adapted to being moved to at least two positions with respect to the perimeter surface in which they are maintained, in one position said flanges lying flat and substantially parallel with said perimeter surface and in another position lying in a plane perpendicular to said perimeter surface, said flanges comprising the sole flange means for holding and supporting said window frame structure when installed said groove being built up on the exterior of said perimeter surface of said head, sill and jambs by a longitudinal flange extending outwardly from said perimeter surface and running the length of said head, sill and jambs, the outer edge of said extended flange being tilted toward said perimeter surface to provide a narrow linear space therebetween which is wider than the thickness of the flat portion of said supporting flanges but not wide enough to permit passage of the folded portion of said flanges, said deeper portion of said groove comprising the space embraced by and between said extended flange and said perimeter surface, said groove being adapted to receive the folded portion of one of said supporting flanges in said deeper portion of said groove.

2. A window frame structure of claim 1 in which said extended flange in the initial portion adjacent to said perimeter surface extends in a direction perpendicular to said perimeter surface.

3. A window frame structure of claim 1 in which said extended flange comprises folded sections of the same metal sheet from which said tubular section is shaped.

4. A window frame structure of claim 1 in which said folded portion of said supporting flange is substantially semi-circular in transverse cross-section.

5. A window frame structure of claim 4 in which said extended flange is substantially semi-circular in transverse cross-section.

6. A window frame structure of claim 1 in which said lateral curved portion of each of said supporting flanges is near but removed from a lateral edge of said flange, said lateral edge extending beyond said curved portion and being outside the groove when said curved portion is within the groove and being also adapted to rest against a perimeter surface of said window frame structure when said supporting flange is positioned with its flat portion in a plane perpendicular to said perimeter surface.

7. A window frame structure of claim 6 in which said extension from said lateral curved portion of said supporting flange is also adapted to press against the outer edge of said extended flange forming said groove, thereby to impart rigidity to said supporting flange when in said position perpendicular to said perimeter surface.

References Cited by the Examiner
UNITED STATES PATENTS

| | | | |
|---|---|---|---|
| 1,561,573 | 11/25 | Smith | 50—120 X |
| 2,126,167 | 8/38 | Breackevelt | 20—56.4 |
| 2,912,078 | 11/59 | Kiehl et al. | 189—75 |

FOREIGN PATENTS

| | | |
|---|---|---|
| 482,340 | 6/53 | Italy. |

HARRISON R. MOSELEY, *Primary Examiner.*